J. W. FREEMAN.
TRACTOR.
APPLICATION FILED NOV. 4, 1915.

1,217,293.

Patented Feb. 27, 1917.
5 SHEETS—SHEET 2.

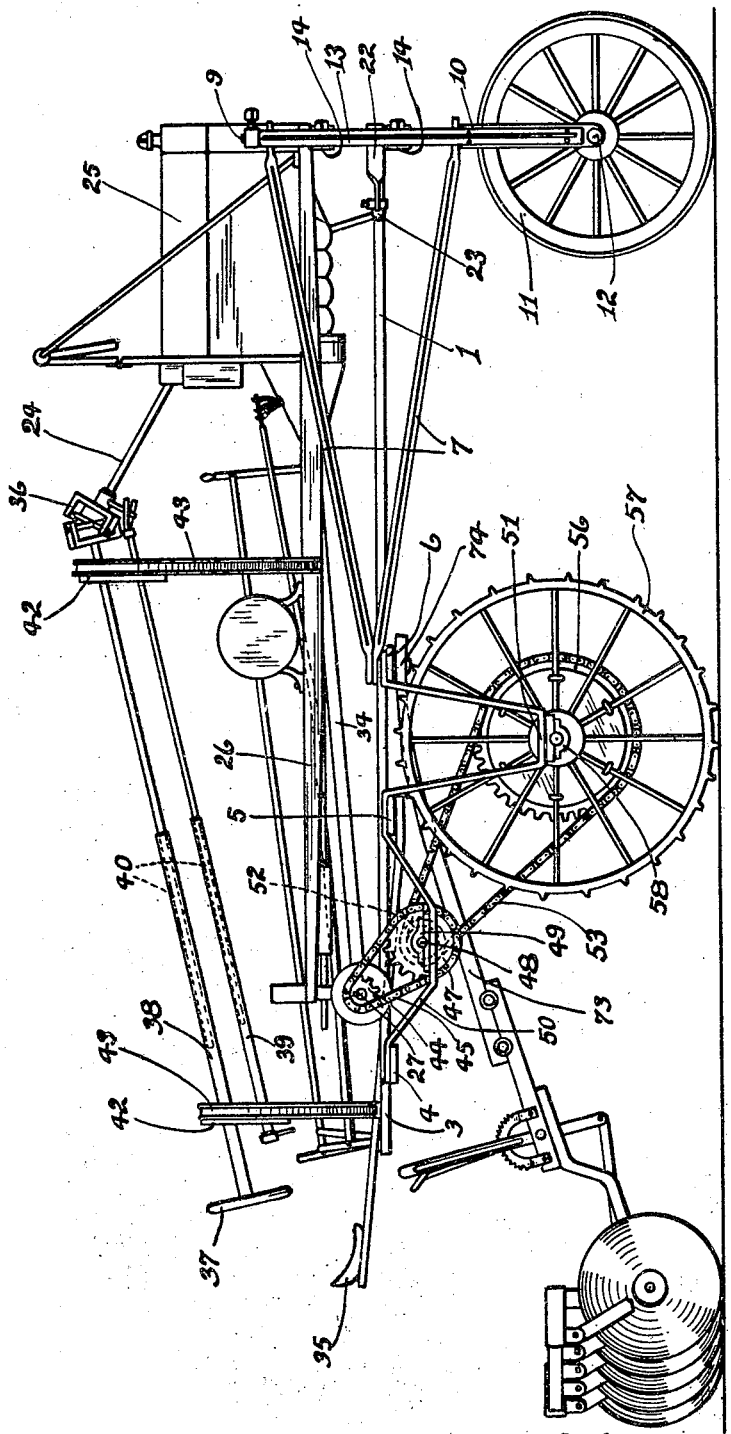

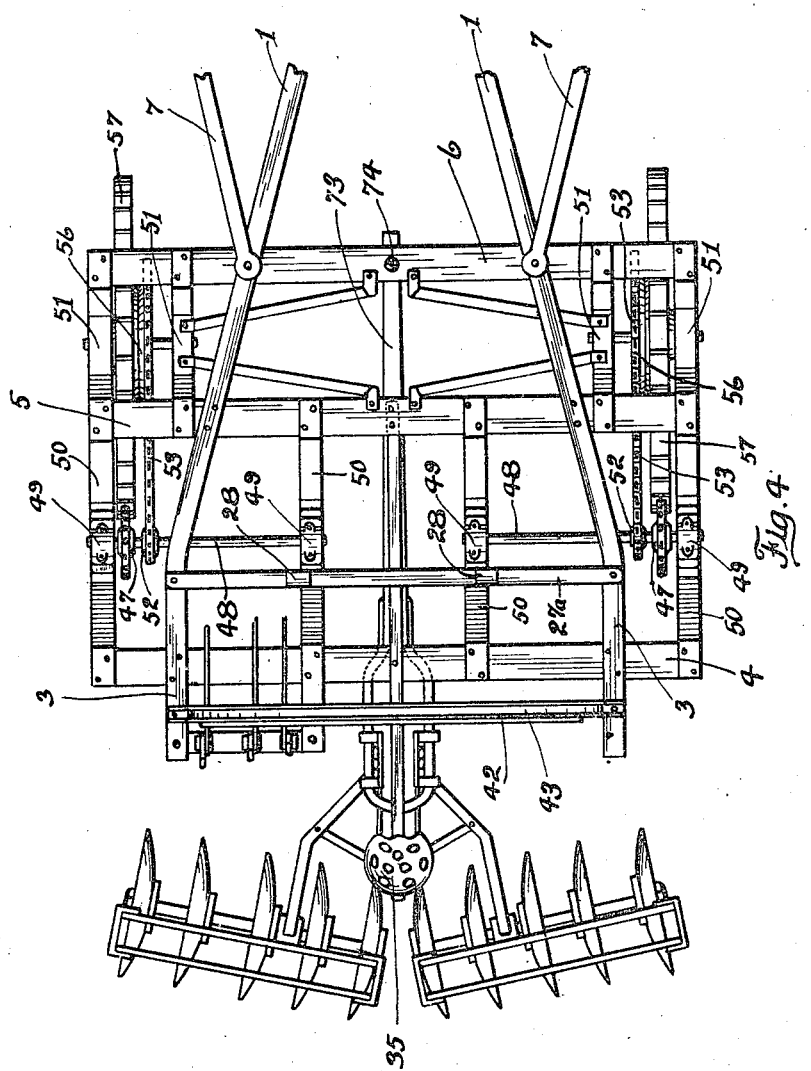

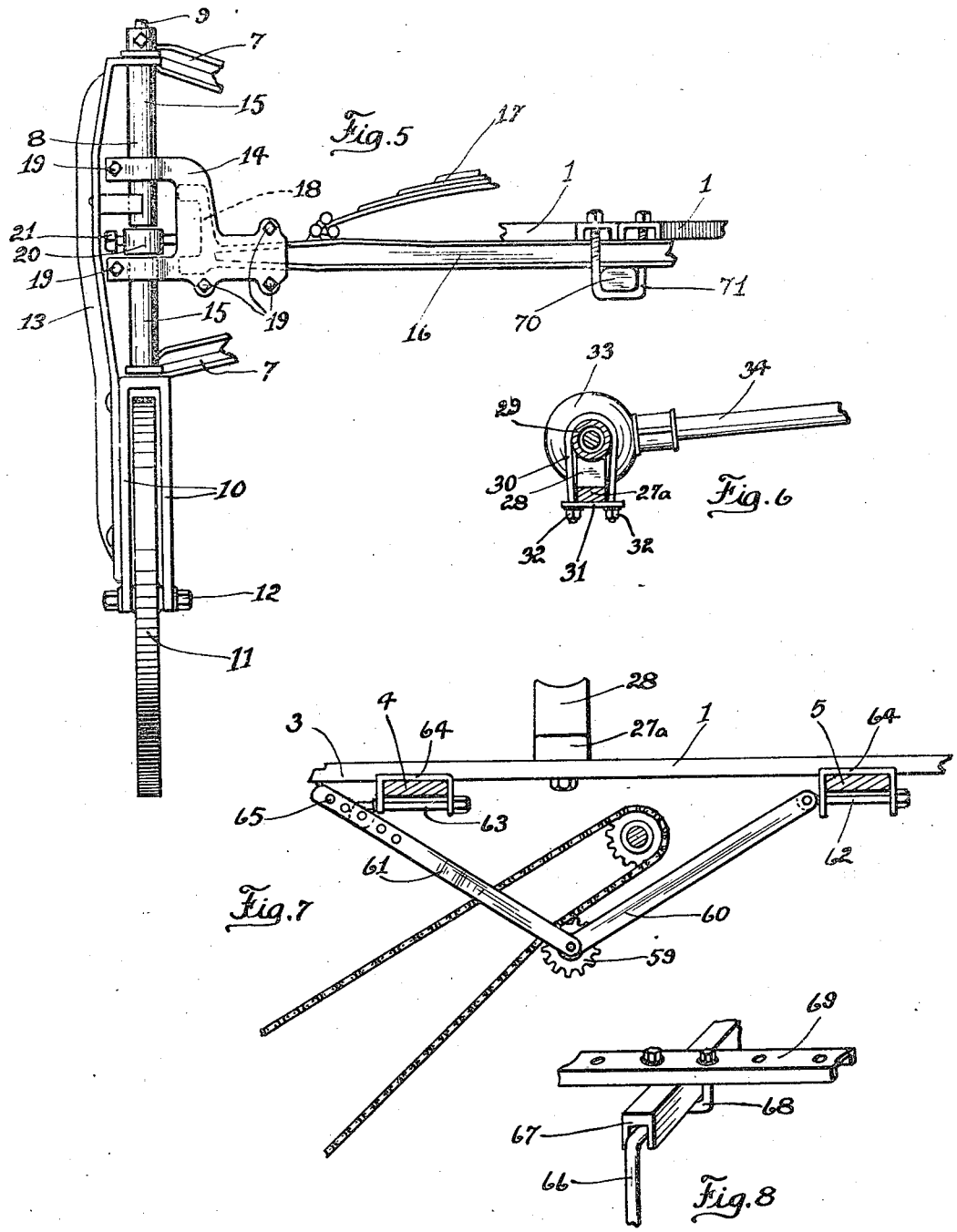

UNITED STATES PATENT OFFICE.

JOSEPH W. FREEMAN, OF COLUMBUS, OHIO, ASSIGNOR OF FORTY-NINE ONE-HUNDREDTHS TO ALLEN CUTHBERTSON, JR., OF COLUMBUS, OHIO.

TRACTOR.

1,217,293.  Specification of Letters Patent.  Patented Feb. 27, 1917.

Application filed November 4, 1915. Serial No. 59,671.

*To all whom it may concern:*

Be it known that I, JOSEPH W. FREEMAN, a citizen of the United States, residing at Columbus, in the county of Franklin and State of Ohio, have invented certain new and useful Improvements in Tractors, of which the following is a specification.

This invention relates to tractors to be used in connection with various farm implements in tilling the soil and the motive power for the same is desirably furnished by an internal combustion engine.

The main object of my invention resides in the provision of such a structure wherein a chain bed framework is provided to be used in connection with the chassis of an automobile, the latter being provided with the internal combustion engine usually used in furnishing this motive power. In other words, I aim to partially dismantle an automobile by taking off the wheels and preferably also the bed portion and applying this stripped framework or chassis to the bed framework forming the foundation of the tractor as a whole.

A further object of my invention resides in the means whereby the chassis may be employed with the front wheels froming a portion of the supporting structure of the bed framework and also the means whereby any type of farm implement may be coupled with the machine as a whole to complete the tractor.

Further novel features of my invention reside in the arrangement for utilizing the rear axle of the automobile after its wheels have been removed for forming the source of power for driving the vehicle as a whole; means whereby the control structure such as the steering mechanism and throttle may be governed from the rear of the vehicle as a whole, in order to enable one operator to manipulate the farm implement as well as the engine.

Further objects and novel features of my invention will appear after a further detailed description of the accompanying sheets of drawings, wherein similar characters of reference designate corresponding parts, and wherein—

Figure 1:
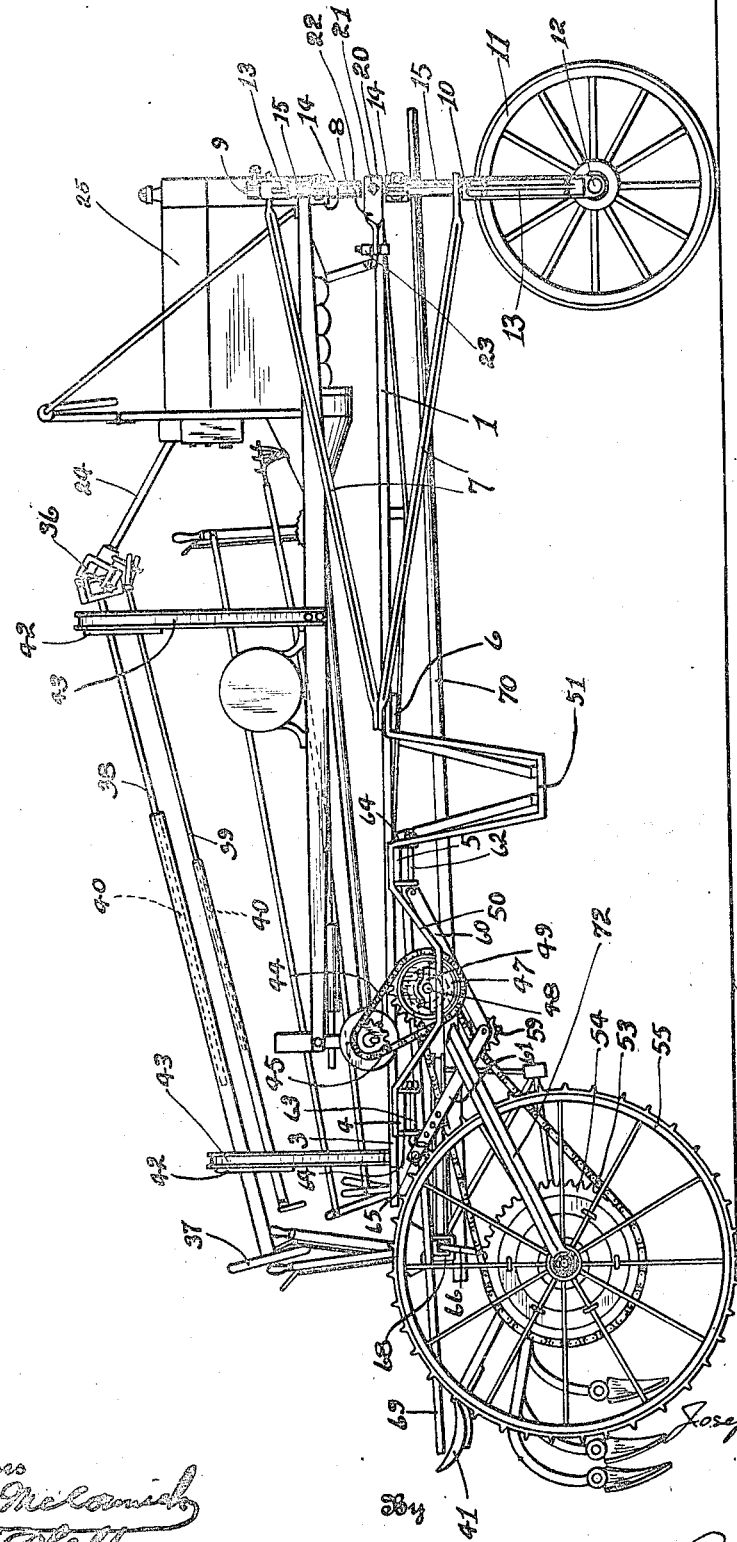
Figure 2:
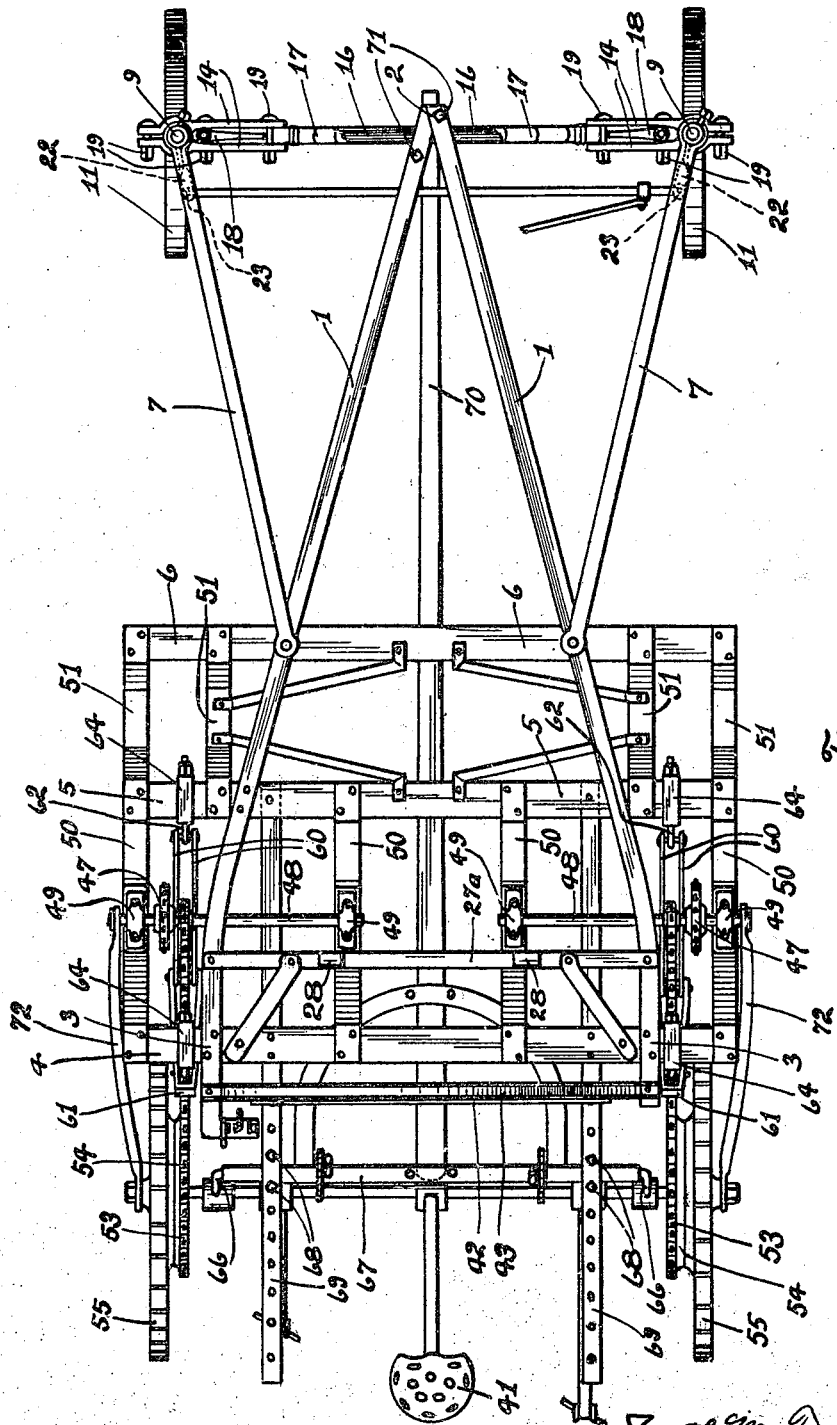

Figure 1 is a side elevation of one form of my invention shown as being used in connection with a plow, Fig. 2 is a top plan view of the structure shown in Fig. 1 with the automobile removed, Fig. 3 is a side elevation of a slightly modified embodiment of my invention with the automobile applied, Fig. 4 is a top plan view of the rear portion only of the structure shown in Fig. 3 and with the automobile removed, Fig. 5 is a front elevation of one of the supporting wheels, Fig. 6 is a detail view showing the manner in which the rear axle of the automobile is attached to the bed framework, Fig. 7 is a detail view of the mechanism utilized for maintaining the driving chain taut, and, Fig. 8 is a detail view in perspective showing the manner in which the farm implement shown in Figs. 1 and 2 is attached to the tractor.

In these several views the framework forming the bed of the tractor as a whole, comprises a pair of bars 1 securely united at their forward ends as shown at 2 and bent to angular form at their rear ends as shown at 3. Toward the rear of the machine there are provided a plurality of cross pieces or stiffeners 4, 5 and 6 whose ends project laterally beyond the angular portions 3 of the bars 1 to some considerable extent. The framework or bed is also reinforced by a plurality of forwardly extending brace pieces 7 attached to the top and lower sides of the members 1 respectively and diverging to be attached to the upstanding spindles 8 forming the means of supporting the front wheels in the manner shown in Fig. 5. These spindles comprise shank portions 9 whose lower ends are provided with forked extensions 10 to embrace the front wheels 11 and to be pivotally attached thereto by means of the stud axles 12. To further reinforce these spindles, I have provided an upstanding brace piece 13 preferably formed of angle iron and extending vertically from the forked extensions 10 to the upper ends of each of the spindles as is also shown in Fig. 5. To these spindles there is then attached clamp members designated in their entirety by the reference numeral 14 and these clamp members are held properly spaced on these spindles by means of the pipe spacers shown at 15. It is a function of these clamp devices to also form the means of attachment with the front axle 16 of the automobile, a portion of which is shown in Fig. 5 and the spring usually carried by this axle being shown at 17 in this same figure. Thus, by means of the clamp devices 14 and the pipe spacers 15, the front axle of the automobile after the wheels have been removed, may be very readily attached, it being understood that the clamp devices 14 suitably embrace the knuckle portions 18 of the front axle to engage the same and then in turn held in position by tightening of the nuts 19. Each of these spindles is also provided with a collar designated 20, which collar is rigidly attached to each of the spindles by means of the set screw shown at 21 or any other suitable means and which is provided with a rearwardly extending arm 22 to serve the function of a steering arm. These arms are then in turn connected with the steering mechanism designated 23 which is normally under the control of the steering post 24 as is customary in all automobiles. As will be understood, the engine of the automobile is confined beneath the hood shown at 25 and the chassis 26 extends rearwardly to be attached to the bed framework through the medium of the automobile rear axle 27. A connector piece 27ª, shown in Figs. 2 and 4, is attached directly between the angular extensions 3 of the frame bars 2 and upon this connector there rests a pair of supporting blocks 28 upon which the inclosing casing 29 of the rear axle is adapted to rest. This axle is then in turn securely mounted in connection with the bed framework by means of the clevis structure 30 shown in Fig. 6, the threaded ends of this clevis passing through an aperture in the tie plate 31 and the latter being forced into engagement with the connector 27 by means of the nuts shown at 32. In Fig. 6, the differential casing is shown at 33 and power is applied to the rear axle through this differential by means of the power shaft 34 which extends to and is connected with the engine beneath the hood 25.

In order that the operator may have control of the power while seated at the rear of the machine, this seat being designated by the reference numeral 35, the steering post 24 is provided with a universal joint 36 and the hand wheel 37 mounted upon a reach rod 38. Similarly, the throttle is extended rearwardly through means of the reach rod 39, each of these being telescopic as is indicated at 40 because the various implements with which the tractor may be used, may extend rearwardly to a greater extent and it may then be found desirable to employ the seat on the implement such as is shown at 41 in Fig. 1, this seat being the seat normally mounted in connection with plows of the type shown. These rods are rotatably supported within boards or the like 42 carried by arched support pieces 43 one of the latter being attached directly to the chassis, while the other is attached to the bed framework.

In order to use the power of the automobile engine, I have provided each end of the rear axle with a sprocket wheel shown at 44 over which a chain 45 passes. These chains in turn pass over sprocket wheels 47 mounted upon a counter shaft 48. This counter shaft is supported in bearings 49 securely fastened to strap members 50, which strap members are shown as being secured at the rear ends to the cross piece 4 and then bent downwardly a slight distance as is shown in Fig. 1 and then up to be attached to the cross piece 5. From this point they are again bent downward to a distance approximately half way between the bed framework and the ground line as is shown at 51, whereupon they can pass upward and are attached to the cross piece 6. The counter shafts 48 are also provided with a pair of sprockets 52 over which chains 53 pass. In Fig. 1, these chains 53 are shown as passing over sprocket wheels 54 attached to the wheels 55 forming a portion of the plow and from this, it will be apparent that the plow wheels form the driving wheels of the tractor as a whole. In Fig. 3 these chains are shown as passing over sprockets 56 which are the same sprockets designated 54 in Fig. 1, but they are shown as being attached to supplemental wheels 57 journaled in bearings 58 securely held in position in the downwardly extending portion 51 of the strap members 50. This latter arrangement is desirable when the tractor is to be used in pulling a disk harrow, for instance, as is shown in this figure, or when the supporting wheels of the farm implement do not possess sufficient strength to sustain the rear portion of the tractor.

In Figs. 1 and 7 there is also shown a chain tightener comprising sprockets 59 pivotally carried in the ends of arms 60 and 61. The opposite ends of these arms are given pivotal support through the medium of eye bolts 62 and 63, these eye bolts passing through the depending legs of embracing U-shaped members 64 embracing the cross straps 4 and 5. However, the arm 61 is adjustably connected by means of a series of apertures shown at 65, through which pins are inserted to pass through the eyes of the bolt 63 and in this manner the chains 53 are maintained taut.

In Fig. 1, the manner of attaching the plow is as follows: These plows are usually provided with an embracing member 66 extending between opposite wheels and also extending up to a point approximately level with the seat 41. This embracing rod is also provided with a channel stiffener as is shown at 67 in Fig. 8 and by means of this channel stiffener, the plow structure as a whole, is attached through the meidum of the U-shaped embracing bolts shown at 68, the ends of their threaded legs projecting through rearwardly extending channel irons 69, Fig. 2. These channel irons are provided with a series of apertures so that the plow may be attached in any one of a plurality of positions. The tongue 70 of this plow is then caused to extend up to the front of the machine and be detachably connected with the bed framework through the medium of the clevis shown at 71, which latter also embraces the ends of the frame bars 1 to thereby hold the entire structure in rigid engagement with the front axle 16 of the motor vehicle. To hold this plow in firmer engagement with the remaining structure, I have also provided a pair of side braces 72 which extend from the axle supporting wheels 55 up to the counter shaft 48 as is shown in Figs. 1 and 2.

As a means of supporting the harrow, as shown in Fig. 3, the tongue 73 is extended to a position directly beneath the cross piece 6 in which position it is pivotally attached as is shown at 74, so that it may have a pivotal movement to enable the tractor as a whole to turn a corner whenever this movement is desired.

From the foregoing description, it will be apparent that I have provided a type of structure wherein an automobile may be utilized as the power unit of a tractor, by simply removing the four wheels and its body. In this manner a pleasure car may be put to the further use of also serving as a means of forming a tractor and in view of the peculiar arrangement of the rear end of the machine, farm implements of various kinds may be attached.

What I claim, is:

1. A tractor comprising a supporting bed, a pair of front wheels pivotally carried by the front portion of said bed, means whereby a farm implement may be attached to the rear portion of said bed, a wheelless automobile suitably supported upon said bed, and means for taking power from said automobile to propel the tractor as a whole.

2. A tractor comprising a supporting bed, a pair of front wheels pivotally carried by the front portion of said bed, means whereby a farm implement may be attached to the rear portion of said bed, a wheelless automobile including the power unit and steering gear suitably supported upon said bed, means for operatively connecting the automobile steering gear with said front wheels, and means for taking power from the automobile power unit to propel the tractor as a whole.

3. A tractor comprising a supporting bed, a pair of front wheels, a pair of upstanding spindles carrying lower forked extensions for pivotal connection with said wheels, means whereby a farm implement may be attached to the rear portion of said bed, a wheelless automobile suitably supported upon said bed, means for attaching the front axle of said automobile to said spindles, and means for taking power from said automobile to propel the tractor as a whole.

4. A tractor comprising a supporting bed, a pair of front wheels, a pair of upstanding spindles carrying lower forked extensions for pivotal connection with said wheels, means whereby a farm implement may be attached to the rear portion of said bed, a wheelless automobile suitably supported upon said bed, means for attaching the front axle of said automobile to said spindles, means for taking power from said automobile to propel the tractor as a whole, means for connecting the steering mechanism of said automobile with said front wheels, a steering extension from said mechanism to the rear of the tractor, and a throttle control extension leading to the rear of the tractor.

5. A tractor comprising a supporting bed, a pair of front wheels pivotally carried by the front portion of said bed, a wheelless automobile including a rear axle suitably supported upon said bed, a sprocket on each end of said axle, a countershaft structure carried by said bed, sprockets on said countershaft, driving chains between said sets of sprockets, means whereby a farm implement may be attached to the rear portion of said bed, and means for driving the tractor as a whole by power taken from said countershaft.

6. A tractor comprising a supporting bed, a pair of front wheels, a pair of upstanding spindles carrying lower forked extensions for pivotal connection with said wheels, brace rods from said spindles to said bed, a wheelless automobile including front and rear axles suitably supported upon said bed, means for attaching said front axle to said spindles, means whereby a farm implement may be attached to the rear portion of said bed, a sprocket on each end of said rear axle, a countershaft structure carried by said bed, sprockets on said countershaft, driving chains between said set of sprockets, and means for driving the tractor as a whole by power taken from said countershaft.

In testimony whereof I affix my signature in presence of two witnesses.

JOSEPH W. FREEMAN.

Witnesses:
 WALTER E. S. BOCK,
 A. CUTHBERTSON.